Nov. 14, 1950  C. A. BLAKESLEE ET AL  2,529,907
MOUNTING FOR INSTRUMENT POINTERS AND PEN ARMS
Filed Nov. 27, 1945
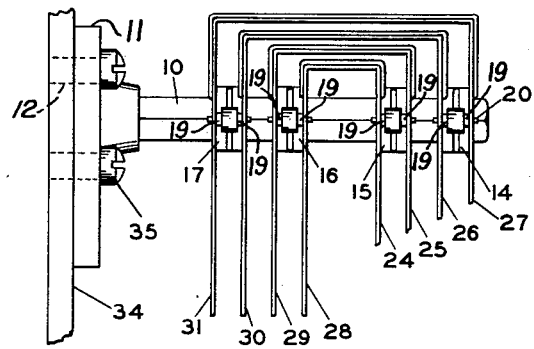
FIG. 1
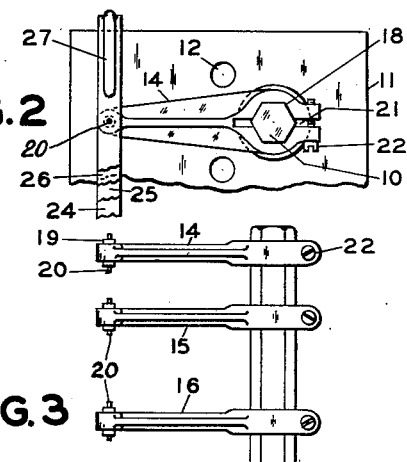
FIG. 2
FIG. 3
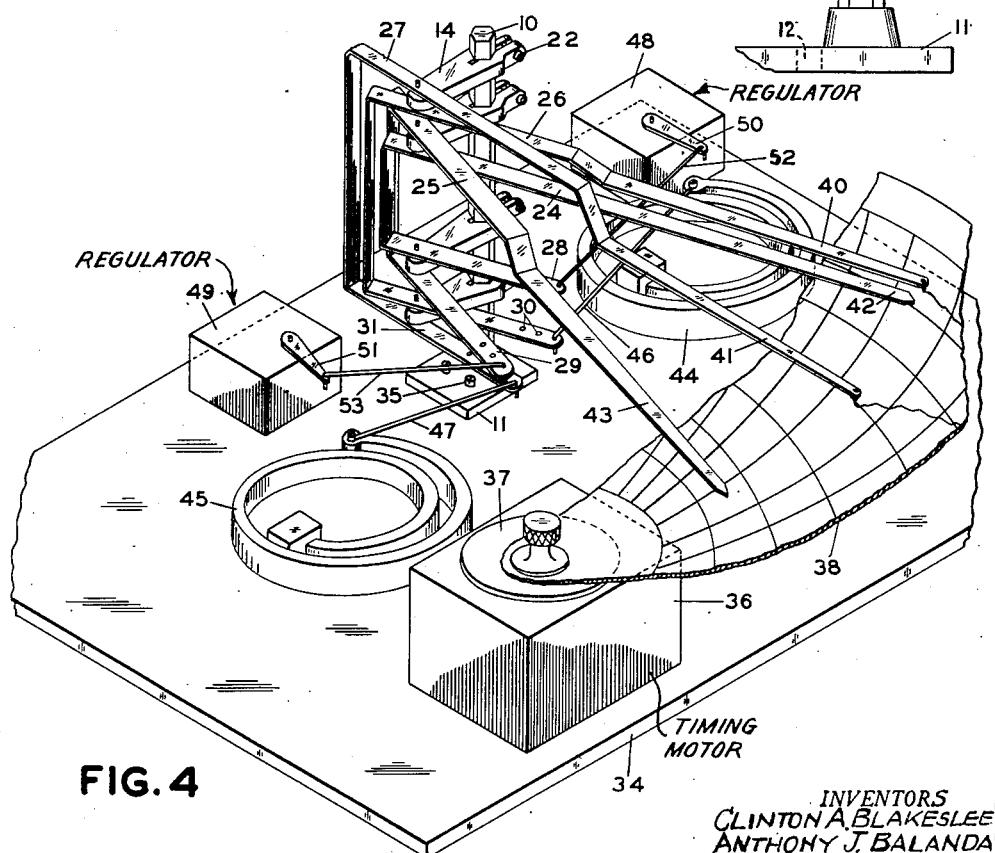
FIG. 4
INVENTORS
CLINTON A. BLAKESLEE
ANTHONY J. BALANDA
BY ERNEST F. DYSON
ATTORNEY.

Patented Nov. 14, 1950

2,529,907

UNITED STATES PATENT OFFICE 2,529,907

MOUNTING FOR INSTRUMENT POINTERS AND PEN ARMS

Clinton A. Blakeslee, Middlebury, Anthony J. Balanda, Wolcott, and Ernest F. Dyson, Waterbury, Conn., assignors to The Bristol Company, Waterbury, Conn., a corporation of Connecticut Application November 27, 1945, Serial No. 631,048

2 Claims. (Cl. 346—145)

This invention relates to measuring instruments, of the multi-index type, and more especially to instruments of that class wherein it is required that two or more movable pointers or arms be deflectable through limited angles about a common axis of rotation. Such an instrument is exemplified in a multiple-pen recorder, or in a combined recorder-controller wherein it is desired that a control-point setting index be adjustable about the same axis of rotation as that of a recording pen, whereby to provide on a common chart scale, an indication of the value to which a magnitude is to be regulated and a continuous record of the values actually attained.

It is an object of the present invention to provide improved means whereby two or more movable arms or pointers in an instrument may be independently and non-interferingly deflected about a common axis and through limited angles of rotation.

It is a further object to provide means of the above nature where any one of said arms may be removed or replaced without affecting the others.

A still further object is to provide means of the above nature wherein there may be effected a wide variety of assemblies by the utilization of a minimum number of parts.

Another object of the invention is to provide a single integral supporting element upon which bracket means for the movable arms or pointers are mounted and are adjustable readily longitudinally of the supporting element.

In effecting the purposes of the invention, it is proposed to provide a pedestal adapted for mounting upon the base of an instrument, and rigidly carrying a pillar having a polygonal or splined section adapted to carry a plurality of identical brackets conformed at one extremity to cooperate with the contour of said pillar in being adjustable therealong in one sense but being constrained by the form of the pillar section to maintain in their location upon a common axis bearing elements carried by said brackets. It is further proposed to provide in cooperation with said brackets a plurality of U-shaped deflectable arm members to be pivotally journalled upon the same. The arm members are adapted to be individually placed upon or removed from said bearing elements by being slightly bent inwardly or outwardly, as the case may be, and are of such relative conformation and proportioning that they may swing non-interferingly about the common axis provided by said bearing elements.

In the drawings:

Fig. 1 is a fragmentary side elevation of an assembly embodying the principle of the invention; and Fig. 2 is a similar view in plan.

Fig. 3 is a front elevation of a mounting portion of the assembly.

Fig. 4 is an isometric view of a two-pen recorder-controller instrument (with a portion of the chart broken away) incorporating the invention therein.

Referring now to the drawings:

A pillar 10 formed of straight metallic rod, having a splined, fluted, key-seated, or polygonal (preferably hexagonal) section, is rigidly secured at one of its extremities to a pedestal 11 having therein one or more openings 12 whereby it may be attached to the instrument of which it is to form a part.

Mounted upon the pillar 10, and longitudinally adjustable therealong, are a plurality of identical bracket members 14, 15, 16 and 17 (numbered in order from the outer extremity of the pillar toward its mounting on the pedestal 11). Each of said brackets has an enlarged extremity with an opening 18 therein conformed to fit the section of the pillar 10, and a reduced extremity having bearing faces provided on opposite sides thereof with small bosses 19, each having immovably secured therein a pin 20 passing therethrough and projecting on both sides, the pins in the several bracket members aligning to provide a plurality of coaxially disposed trunnions or pivot bearings. In the enlarged extremity of each bracket is formed a slot 21, permitting limited deformation of the material of said bracket, whereby a screw 22 passing through said extremity perpendicular to said slot may be utilized to clamp the bracket to the pillar 10 in any selected position therealong.

In the assembly as illustrated, provision is made for the mounting of four independent deflectable members 24, 25, 26 and 27, each comprising an inner U-shaped portion (preferably having longitudinal crimping for rigidity), the opposite sides of each of said portions having aligned perforations to cooperate with selected ones of the pins 20 to provide pivot bearings for said members. The relative proportioning of said deflectable members will be governed by the nature of the ultimate assembly, of which Fig. 4 is a single example; but, in general, the assembled relationship will be understood by reference to Fig. 1.

The basic positioning of the several supporting brackets and the spans of the several U-shaped portions of the deflectable members will be governed by the types and arrangement of measuring or control instrumentalities and of pens or pointers embodied in the design of the particular instrument under consideration. Let it be assumed that the span of the innermost of the members, designated as 24, has been established by a predetermined correlation of parts, this distance may then be taken as a basis for locating pairs of the brackets 15 and 16, between which it will be journalled. This member is then fitted between the inner boss portions of said brackets, the pins 20 thereon coacting with the aligned perforations in the sides of said U-portion to provide pivot bearings about which said member may be freely deflected. The distance between brackets 15 and 16 having been established, the member 25 is made with a U-portion having a span greater than that of the corresponding portion of the member 24 by an amount equal to the sum of the thicknesses of the bearing parts of the engaged brackets; and the opposed faces of said U-portion engage the outer faces of said brackets, being also pivotally supported by the pins 20. Said U-portion is formed, not only broader, but longer, than that of the member 24, whereby to embrace the same with a working clearance, and to swing freely in relation to the same. The member 24 is positioned between brackets 15—16 by bending it inwardly to clear the ends of the pins 20, and allowing it to spring into its normal operating position in engagement with the bosses 19 and the pins 20. In a similar manner, the member 25 is installed by bending it outwardly sufficiently to clear the ends of said pins, and allowing it to spring into its normal operating position.

The deflectable members 26 and 27 are made of such dimensions that the former will be freely movable within the latter and outside the member 25; and they are installed on the brackets 14 and 17 in a manner identical with the mounting of the members 24 and 25, the member 26 being bent inwardly, and the member 27 outwardly and both members being sprung into place in pivotal relation to the pins 20 on the corresponding bracket members.

The members 24, 25, 26 and 27 terminate on the extremities toward the mounting pedestal 11 in radially extended arms 28, 29, 30 and 31, respectively; and their other extremities are extended to form indicating or recording elements as required, and of which one combination will presently be disclosed. There has thus been provided a multiple mounting, whereby a plurality of angularly deflectable elements may be mounted in coaxial relationship for non-interfering deflection through large angles, and wherein, by minor changes in dimensions and by suitable adjustments, a variety of arrangements is made possible.

In Fig. 4 is shown one of a variety of ways in which an assembly embodying the principles of the invention may be utilized. The bearing assembly hereinbefore described is secured to a base plate 34 by means of screws 35 passing through the openings 12 in the pedestal 11, whereby the pillar 10, with the several bracket members carried thereby, will project perpendicularly from the surface of said base plate, with the deflectable members 24, 25, 26, and 27 free to swing about a common axis through limited angles in respective planes parallel to the surface of said plate.

Mounted upon the base-plate 34 at a location some distance removed from the pedestal 11 is a chart carrying mechanism, including a timing motor 36 adapted to rotate a platen 37 to which may be secured a circular record chart 38, having thereon suitable graduations. The extremity of the deflectable member 26 which is remote from the pedestal 11 is extended to form a pen-arm 40 adapted to inscribe on the surface of the chart 38 a continuous record of its deflected positions. In actual practice, there would be included between the pen-arm 40 and the part of the member 26 to which it is attached an adjusting element, whereby to modify the angular relation between said parts; but, as such an adjustment forms no part of the present invention, it is, in the interest of clarity, omitted from disclosure. The extremity of the deflectable member 27 is, in the manner of the member 26, fitted with an extended pen-arm 41 adapted to inscribe on the chart surface, and preferably on an ordinate as closely juxtaposed as possible without mechanical interference to the path followed by the marking element of the pen-arm 40. The free extremities of the deflectable members 24 and 25 are provided with extended index-pointers 42 and 43 respectively, adapted to excurse across the surface of the chart 38 on a common arc substantially coincident with that followed by the recording pens, providing on the graduated surface of the chart independent indications of the adjusted positions of said members. It will be understood that the two pen arms and the two index arms will be provided with such offsets as may be necessary to bring the recording pens and the pointers into close operative relationship with the surface of the chart.

Mounted upon the base-plate 34 are responsive members (in this instance, Bourdon springs) 44 and 45, each having a free extremity adapted to deflect in response to variations in a (pressure) condition to be measured, and operatively attached to the arms 30 and 31 respectively by means of extended links 46 and 47. Thus deformations of the responsive members due to changes in magnitudes to be measured will produce corresponding deflections of the pen arms 40 and 41 respectively, whereby there will be provided on the surface of the chart 38 continuous records of the values of those variables.

Also mounted upon the base-plate 34 are regulating devices 48 and 49 in operative association (by means of instrumentalities not shown in the drawings) with the magnitudes to which the members 44 and 45 are responsive, whereby to control the values of said magnitudes, and subject to adjustment of their respective control points by means of crank-arms 50 and 51. The arm 50 is operatively attached to the extended arm 28 by means of an extended link 52, and the arm 51 to the extended arm 29 by a link 53. Thus, by suitably proportioning and adjusting the interrelated elements of the mechanism, the control point settings of the respective regulating devices may be brought into agreement with the positions of the indexes 42 and 43 with respect to the chart graduations, so that under ideal conditions the marking element of the pen-arm 40 will tend to coincide with the pointer 42 and that of the arm 41 with the pointer 43, and any departure of a pen from the position of its corresponding index will be a measure of the change yet to be effected in the magnitude under control.

While the mechanism embodying the principles of the invention has been shown in but one of its possible applications, it will be apparent to those versed in the art that, with a minimum number of standard parts and with minimum changes in assembly, there may be obtained a great variety of arrangements applicable to a

We claim:

1. In a measuring instrument: a pillar, a plurality of bracket means adapted to be supported thereon at one end and including means to selectively clamp the same independently therealong, bearing members at the opposite end of each of said bracket means and each including oppositely-directed pins affording trunnions extending at right angles to a bracket means, all trunnions being aligned with one another, and a U-shaped deflectable member fitted over a pair of the bracket means, its arms engaging respective and oppositely-directed trunnions thereof.

2. In a measuring instrument: a pillar, a plurality of bracket means adapted to be supported thereon at one end and including means to selectively clamp the same independently therealong, bearing members at the opposite end of each of said bracket means and each including oppositely-directed pins affording trunnions extending at right angles to a bracket means, all trunnions being aligned with one another, and a resilient, U-shaped deflectable member mounted over a pair of the bracket means and its arms perforated to engage respective oppositely-directed trunnions thereof.

CLINTON A. BLAKESLEE.
ANTHONY J. BALANDA.
ERNEST F. DYSON.

REFERENCES CITED

The following references are of record in the file of this patent:

UNITED STATES PATENTS

| Number | Name | Date |
|---|---|---|
| 1,264,522 | Jay | Apr. 30, 1918 |
| 1,778,702 | Bristol et al. | Oct. 14, 1930 |
| 1,925,515 | Beck | Sept. 5, 1933 |
| 2,208,140 | Stake | July 16, 1940 |
| 2,248,429 | Klein et al. | July 8, 1941 |
| 2,257,998 | Beal | Oct. 7, 1941 |